Jan. 22, 1935.  A. M. THOMSON  1,988,925

SEPARABLE FASTENER AND INSTALLATION THEREOF

Filed Sept. 10, 1932

Inventor
ALFRED MORRIS THOMSON

By *Davies Davis*

Attorneys

Patented Jan. 22, 1935

1,988,925

UNITED STATES PATENT OFFICE 1,988,925

SEPARABLE FASTENER AND INSTALLATION THEREOF

Alfred Morris Thomson, East Orange, N. J., assignor to Dardelet Threadlock Corporation, New York, N. Y., a corporation of Delaware Application September 10, 1932, Serial No. 632,534

1 Claim. (Cl. 85—1)

This invention relates to separable fasteners and installations thereof.

This invention has for its principal objects to provide a highly efficient separable fastener of the kind comprising a thread coupled bolt and nut, and to provide a strong and efficient installation of separably secured work pieces and a separable bolt and nut type of fastener penetrating and separably holding together the work pieces.

Also included among the purposes of the invention are the provision of an efficient substitute for a rivet as a fastener for work pieces or structural parts, and the provision of a practicable and strong separable structural installation or joint suitable for use in situations where the use of riveted structural parts has heretofore been considered necessary or desirable.

Other purposes or objects are to provide a separable fastener of the kind comprising a thread coupled bolt and nut, which fastener will have great strength in tension and shear, afford maximum support to the secured pieces against movement in shear, securely hold the pieces in detachably assembled relation against accidental relative movement, close the fastener receiving apertures in the fastened pieces, prevent leakage through and protect the threads of the elements of the fastener, and prevent accidental loosening or disconnection of the elements of the fastener.

A further object is to provide a fastener of the bolt and nut type wherein the nut is adapted to entirely enclose the threaded portion of the bolt shank.

To the foregoing ends, and other ends which will appear from the following description of the preferred embodiment of the invention illustrated in the accompanying drawing, the invention consists of the novel devices, constructions, and combinations of parts hereinafter described and claimed.

Figure 3:
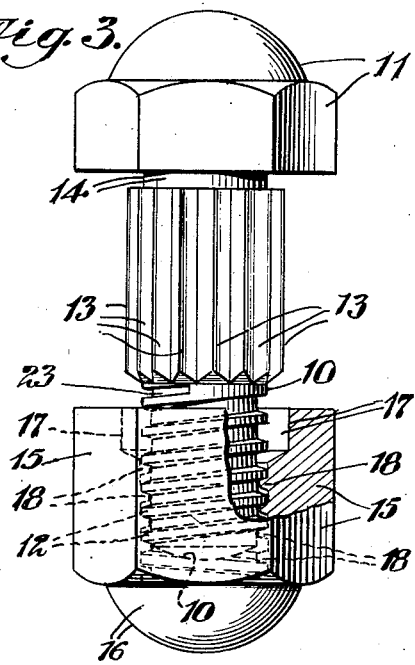
Fig. 3 is a view partly in section showing the separable fastener.
Figure 4:
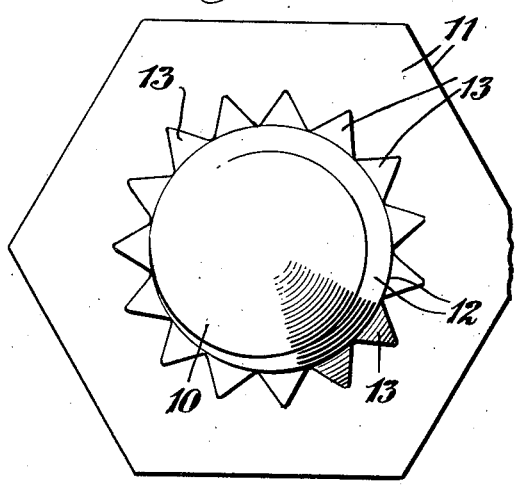
Fig. 4 is an end view of the bolt member of the separable fastener prior to installation, the view showing the bolt as it appears when looking directly at the threaded end thereof and being made on the same scale as Fig. 2.

The separable fastener is of the kind comprising a bolt and a nut separably screwed together. The bolt has a shank 10 which is of round cross section, is headed at one end to provide a suitable bolt head or fixed clamping head 11, is screw threaded for a portion of its length at its opposite end to provide a bolt thread 12, and is enlarged from the inner end of its threaded portion substantially to the bolt head by integral longitudinally extending ribs 13 which are preferably normally of inverted V-shape in cross section and joined at their bases as is apparent from Figs. 3 and 4. Preferably the ribs 13 terminate just short of the work abutting face of the bolt head, so that the enlarged ribbed or longitudinally corrugated portion of the bolt shank is joined to the bolt head by a very short neck portion 14 of the shank, for the purpose hereinafter described.

The detachable head of the fastener comprises a cap nut whose body 15 has its axial bore closed at the head of the nut as, for example, by a dome shaped cap portion 16 of the nut. At the base of the nut, the axial bore is counterbored or enlarged in diameter for a portion of its length to provide a central cylindrical recess 17, and the unenlarged inner portion of the axial bore is screw threaded to provide a nut thread 18.

The internal diameter of the non-threaded, centrally recessed, base portion of the cap nut thus provided is at least as great as the maximum diameter of the bolt shank, i. e. as great as the major diameter of the enlarged ribbed portion of the bolt shank, but preferably the internal size of the recessed base of the nut is made slightly greater than the external size of the ribbed portion of the bolt shank as shown. The height of the nut is greater than the length of the threaded portion of the bolt shank upon which the nut is screwed, the threaded portion of the bolt shank being of such length as to permit it to be screwed into the cap nut until it is entirely enclosed by the cap portion 16 and the internally threaded portion of the main body 15 of the nut without the tip of the bolt abutting the inner face of cap portion 16. The depth and diameter of recess 17 in the base of the nut are such that the nut may rotatively encompass the enlarged ribbed portion of the bolt shank before the leading end of the nut thread is screwed fully up to the inner end of the bolt thread, as shown in Fig. 1.

The bolt and nut may be formed of any suitable metal, and their coupling threads 12 and 18 may be of any suitable kind. Preferably, however, the bolt and nut are provided (as shown) with the well known Dardelet self-locking screw threads which automatically interwedge at any point to which they are screwed together when the screwing on of the nut causes the coupled bolt and nut to exert clamping effort on the work pieces which are fastened by the bolt and nut. A pair of these threads are axially displaceable from an unlocked relation (shown in Fig. 3) into a frictionally locked or elastically interwedged relation (shown in Fig. 1) simply by screwing up the nut to clamp the work pieces between the bolt head and the nut, the nut thread moving across the thread groove in the bolt during the final tightening of the nut, and both the root of the bolt thread and the crest of the nut thread being slightly conoidal and tapering toward the bolt axis in the direction of the bolt head as shown for tight interwedging of the threads against accidental unscrewing.

Figure 1:
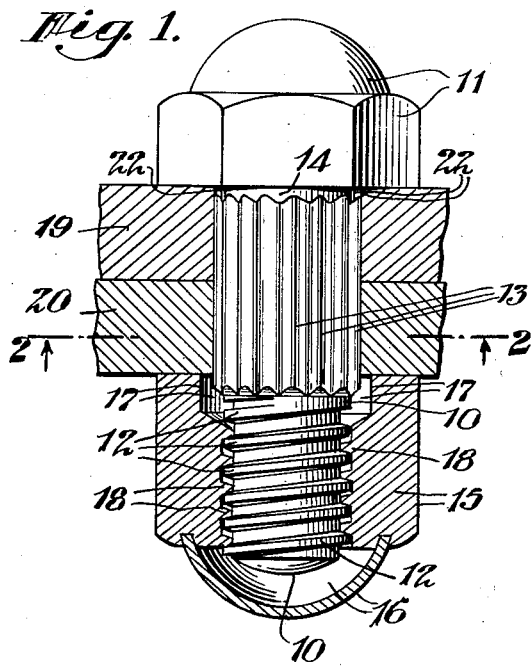
Fig. 1 is a sectional view of a separable joint showing the improved separable fastener installed.
Figure 2:
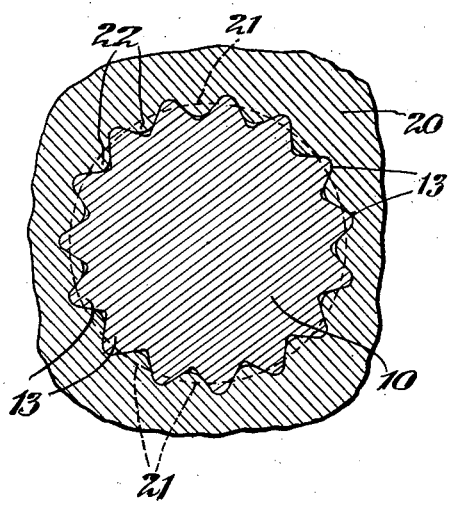
Fig. 2 is a sectional view on an enlarged scale taken on the line 2—2 of Fig. 1.

In Figs. 1 and 2 there is shown a typical separable structure or installation embodying the invention and wherein is employed the improved separable fastener heretofore described. In these views, 19 and 20 are abutted metal work pieces or plates originally pierced by registering round holes of the same diameter and indicated by the dotted circle 21 in Fig. 2, the normal diameter of which holes (as is evident from Figs. 1 and 2) is or was greater than the diameter of all parts of the bolt shank except the enlarged ribbed portion of the shank which has a greater major diameter than the normal diameter of the round holes 21. The pieces 19 and 20 are penetrated by the bolt shank, whose enlarged ribbed portion has been driven or otherwise forced endwisely into the holes until it extends entirely through both pieces with the work-abutting face of the bolt head abutting piece 19. In so forcing ribs 13 through the holes the peripheries of the holes have been deformed as shown in Figs. 1 and 2 to a ribbed or corrugated profile indicated at 22 so that the ribbed portion of the bolt shank is tightly and positively interlocked with the pieces. Such forcing of the bolt usually results in some slight deformation of the sharp peaked ribs 13, as indicated in Figs. 1 and 2, and in the forcing of some of the rib metal toward the bolt head where it is received in the clearance space afforded by the short neck portion 14 of the shank as shown in Fig. 1. The nut is shown as having been screwed upon the protruding threaded end of the bolt until pieces 19 and 20 are tightly clamped between the work abutting faces of the bolt head and the nut, and until the self-locking screw threads have been relatively displaced into self-locked or interwedged relation by the tightening of the nut. The non-threaded, centrally recessed base portion of the tightened nut encompasses the protruding end of the enlarged ribbed portion of the nut.

It will be obvious that, since the length of the bolt shank receiving passage of the nut from its closed end to the opposite or open end of the threaded portion of the said passage corresponds substantially to the length of the threaded portion of the bolt shank, the entire threaded portion of the shank may be enclosed in said portion of the nut passage, and that the enlarged non-threaded end portion of the passage may receive at least a substantial portion of the enlarged ribbed portion of the shank. The threaded portions of the fastener may thus mutually coact to protect the same when the fastener elements are screwed fully together before use or installation in a joint, and the nut protects the threaded bolt end after installation of the fastener. Furthermore, this construction of the fastener insures and permits the tight clamping of work pieces with the ribbed portion of the bolt shank extending at least entirely through both pieces and permits such clamping of pieces varying in total thickness.

As the pieces are tightly engaged by the work abutting faces of the nut and the bolt head around the holes in the pieces outwardly beyond the crests of the ribs, and as the outer end of the thread connection is sealed by the closed head of the nut, the joint is sealed against leakage through the bolt holes 21. The rib interlock of the bolt with the pieces prevents relative rotary movement between the bolt and the pieces, affords a large area of support for the pieces in shear, and the tight driven fit of the bolt in the pieces prevents relative lateral or cocking movements between all parts of the assembly. Since the nut and bolt are locked together against accidental relative rotation by the self-locking threads the nut cannot turn accidentally relatively to the pieces or the bolt, or turn with the bolt relatively to the pieces, and the entire assembly is thus tightly held together against accidental movement between any of its parts in any direction and yet is readily separable should separation become desirable for any reason.

While useful in many ways, the invention is especially advantageous in that it affords a substitute for rivet fasteners and riveted assemblies, affording a stronger fastener and joint without the disadvantages of inseparability, looseness of the fastener in the holes of the fastened pieces, and the noise and expense incident to the production of riveted assemblies. The invention also provides a fastener of the kind comprising a bolt and nut separably coupled by screw threads, having the advantages hereinbefore pointed out.

Since, as heretofore described, the proportions of the bolt and cap nut are such that the cap nut may be screwed upon the bolt until the entire threaded end portion of the bolt is housed in the cap nut between the closed head end of the nut and the leading end of the threaded portion of the nut bore without the tip of the bolt shank abutting the cap portion 16 of the nut, it will be obvious that the invention provides an article of manufacture comprising a bolt and a cap nut screwable together until their threads bind together at the imperfect inner extremity 23 of the thread groove of the bolt, in which maximum coupled relation of the bolt and cap nut the said bolt and nut are frictionally locked in a coupled relation in which their threads are protected or unexposed and the threaded portion of the bolt is completely and closely housed or interfitted in the nut bore. By so fully coupling the elements of the fastener for sale and shipment an improved article of manufacture or commerce is provided.

What I claim is:

As an article of manufacture, a two-part separable fastener comprising a bolt of which the shank has a threaded end portion and a head and is enlarged between said threaded portion and head by longitudinal ribs for the effecting of a driven interlocked engagement of said bolt in a bolt-hole, and a cap nut screwed upon said bolt and provided with a bolt-shank-receiving cavity having an enlarged non-threaded end portion in which the leading ends of said bolt shank ribs are housed and a threaded portion which extends from the innermost end of the threaded portion of the bolt shank toward the closed end of the nut cavity and is releasably thread-locked to said threaded portion of the bolt shank, whereby the two parts of the fastener are held locked by their coupling threads, against accidental unscrewing movement between said parts, in an assembled relation in which their threads and the adjacent leading end portions of the bolt shank ribs are protected.

ALFRED MORRIS THOMSON.